United States Patent

Westover

[11] Patent Number: 6,120,157
[45] Date of Patent: Sep. 19, 2000

[54] FINGER MOUNT REAR VIEW MIRROR

[75] Inventor: Scott R. Westover, 35A Clinton St., Concord, N.H. 03301

[73] Assignee: Scott R. Westover, Contoocook, N.H.

[21] Appl. No.: 08/795,412

[22] Filed: Feb. 5, 1997

[51] Int. Cl.⁷ .............................. G02B 5/08; G02B 7/182; B60R 1/00
[52] U.S. Cl. ............................................ 359/871; 359/879
[58] Field of Search .................................. 359/871, 872, 359/879, 517

[56] References Cited

U.S. PATENT DOCUMENTS

| D. 236,458 | 8/1975 | Sargis | 359/879 |
|---|---|---|---|
| 1,139,560 | 5/1915 | Mosher | 359/879 |
| 1,439,836 | 12/1922 | Pease | 359/879 |
| 1,499,175 | 6/1924 | Holquist | 359/879 |
| 1,534,374 | 4/1925 | Wanz et al. | 359/517 |
| 1,535,105 | 4/1925 | Cota | 359/517 |
| 1,592,534 | 7/1926 | Mitchel | 359/517 |
| 1,681,874 | 8/1928 | Ouellet | 359/879 |
| 3,428,286 | 2/1969 | Del Pesco | 248/481 |
| 3,687,713 | 8/1972 | Adams . | |
| 3,717,403 | 2/1973 | Messier | 359/879 |
| 4,863,239 | 9/1989 | Malone . | |
| 4,946,257 | 8/1990 | Feinbloom et al. | 359/399 |
| 5,361,169 | 11/1994 | Deal | 359/838 |
| 5,530,588 | 6/1996 | Vivier | 359/879 |

FOREIGN PATENT DOCUMENTS

| 916960 | 12/1972 | Canada | 359/879 |
|---|---|---|---|
| 0050845 | 10/1935 | Denmark | 359/517 |
| 26919 | 11/1919 | United Kingdom | 359/879 |
| 263715 | 1/1927 | United Kingdom | 359/879 |
| 345766 | 4/1931 | United Kingdom | 359/879 |

Primary Examiner—Ricky D. Shafer

[57] ABSTRACT

A viewing apparatus that can be mounted to a user's finger so that the user can see what is behind him/her. A convex reflective surface is provided that corresponds to the dimensions of a typical user's finger. The apparatus attaches to the user's finger by a strap having hook and loop fasteners. The loop fastener is placed on stretchable material so that apparatus can fit comfortably on the user's finger. An insert is provided which enables the apparatus to the conform to the shape of the user's finger and also assists in attaching the strap to the main body housing the reflective surface. The reflective surface utilizes the reflective properties of a material such as aluminum to provide high reflective quality.

3 Claims, 5 Drawing Sheets

FINGER MOUNT REAR VIEW MIRROR

BACKGROUND OF THE INVENTION

1. Field of the Invention

This invention relates to rear view mirrors, especially rear view mirrors worn by users as an accessory.

2. Description of the Related Art

Athletes, outdoor enthusiasts and pedestrians of all kinds often share the road or track with vehicles or other people. They are offered a variety of inventions which provide some measure of a rear view, which are used to gather information about their surroundings. This information is then used to make important decisions related to their motion and or direction, which effects their level of safety.

Most of these accessories are complex, uncomfortable or unsafe. Users may be forced to make permanent or semi-permanent alterations to their equipment, or rely on accessories that are cumbersome to use. In some cases, the awkward body motions, which are required to use these inventions, make the equipment ineffective or unreliable.

In efforts to create more effective means of supplying rear viewing through the use of a reflective surface, various attempts have been made. U.S. Pat. No. 4,603,944, issued to Greenlaw et al. during 1986, disclosed a way to attach a mirror to an existing accessory, such as a pair of eyeglasses or a safety helmet. A user of this invention must use accessories in combination with other equipment to obtain the desired rear view ability. This device is not suitable for users who do not use any accessories or those who do not wish to risk marking or damaging their accessories. In addition, this device usually requires the use of a rod to keep the mirror far enough away from the eye as to be useful. In the event of an accident, as in bicycling or in line skating, this rod may be in a position to cause injury to the user, especially in the area of the eye.

U.S. Pat. No. 5,537,160, issued to King during 1996, discloses the idea of integrating a mirror into the user's eye wear. Using this invention may inconvenience the user, as it requires semipermanent installation in eye wear, which must be purchased additionally by the user.

Still another attempt at providing rear view capability by a user is disclosed in U.S. Pat. No. 5,044,741, issued to De Giacomi during 1991. The reference discloses a similar solution as disclosed by King. A method of adhering a mirror device to existing lenses is provided which results in many of the disadvantages already noted. Both King and De Giacomi require that the user must be wearing the disclosed device and customized eye wear to permit rear viewing. Also, the user must moue the head, even when such movement is awkward or dangerous, in order to achieve even a useful rear view.

In U.S. Pat. No. 5,361,169, issued to Deal in 1994, a mirror is disclosed that does not require the use of a secondary accessory. This device does not take advantage of human ergonomic positioning in that Deal requires the device to be strapped onto the user's wrist. To obtain a rear view, a user must frequently moue the wrist into an awkward position to achieve the desired rear view. The awkwardness of these motions is due to the limitations of arm movement available to the normal user, and the relationship between those movements and the user's field of vision.

U.S. Pat. No. 4,863,239, issued to Malone in 1989, discloses the use of a mirrored glove. This device eliminates the danger of mirrors that incorporate a rod which may injure the eye and places the mirror in a more suitable position for easier viewing. However, since the device must be applied to a glove, activities which require gloves, such as biking, or other accessory equipment, such as wrist braces, cannot be used with Malone's device. Further, this device limits the ability to feel and adjust sensitive controls such as gears, helmet safety adjustments and the like, which require tactile sensitivity to use and gloves are not desirable.

Still another device is disclosed in U.S. Pat. No. 5,370,407, issued to Whalen in 1994. This device incorporates a rear view mirror with a ski pole style device. While this approach provides a useful and easily negotiable rear view, it also eliminates the use of the hand (or hands) to tend to equipment or emergency stops. Also, as previously discussed inventions, the device is dependent on accessories beyond the mirror and its mounting apparatus, therefore making the invention unsuitable without an additional piece of equipment.

It is not disclosed or suggested in the prior art, a rear view apparatus that does not require the user to use additional pieces of equipment; that can be releasable attached to existing pieces of equipment, such as gloves, wrist braces, without damaging that equipment; that can be easily maneuvered to obtain a rear view; that does not prevent the user from using their hands to adjust equipment as needed in the course a given activity; does not interfere with the user from making an emergency stop or to prevent an accident; does not require the use of a potentially dangerous rod element as a means to mount the apparatus; is an ergonomical design so that a rear view can be achieved without the user having to make awkward movements.

SUMMARY OF THE INVENTION

It is an aspect of the invention to provide a finger mount rear view mirror that does not require the user to use additional pieces of equipment.

It is another aspect of the invention to provide a finger mount rear view mirror that a user may use with any equipment that the user selects.

It is still another aspect of the invention to provide a finger mount rear view mirror that delivers a complete and accurate rear view with a comfortable, natural motion of the finger.

Another aspect of the invention is to provide a finger mount rear view mirror that allows a user the full use of his/her hands to adjust equipment, break an emergency fall, etc.

It is still another aspect of the invention to provide a finger mount rear view mirror that does not use a rod-style of mounting to eliminate possible eye injury.

Finally, it is an aspect of the invention to provide a finger mount rear view mirror that maximizes physical relationships between different parts of the human body, in particular, the relationship between the finger and the eye to deliver the most effective view with the least effort from the user.

Other aspects and advantages of the present invention will become apparent and obvious from a study of the following description and the accompanying drawings which are merely illustrative of the invention.

The invention is a viewing apparatus to enable a user to see a portion of the user's surroundings which are behind said user and which said user wishes to view. A main body having a top, bottom and a shape that corresponds to one of the user's fingers is provided. A reflective surface attached to the top of said main body is provided. Mounting means for attaching said main body to the user's finger is provided.

Said user can position the finger with the mounted apparatus so that when said user looks into said reflective surface, said user is able to see the portion behind said user that said user wishes to view.

Figure 1:
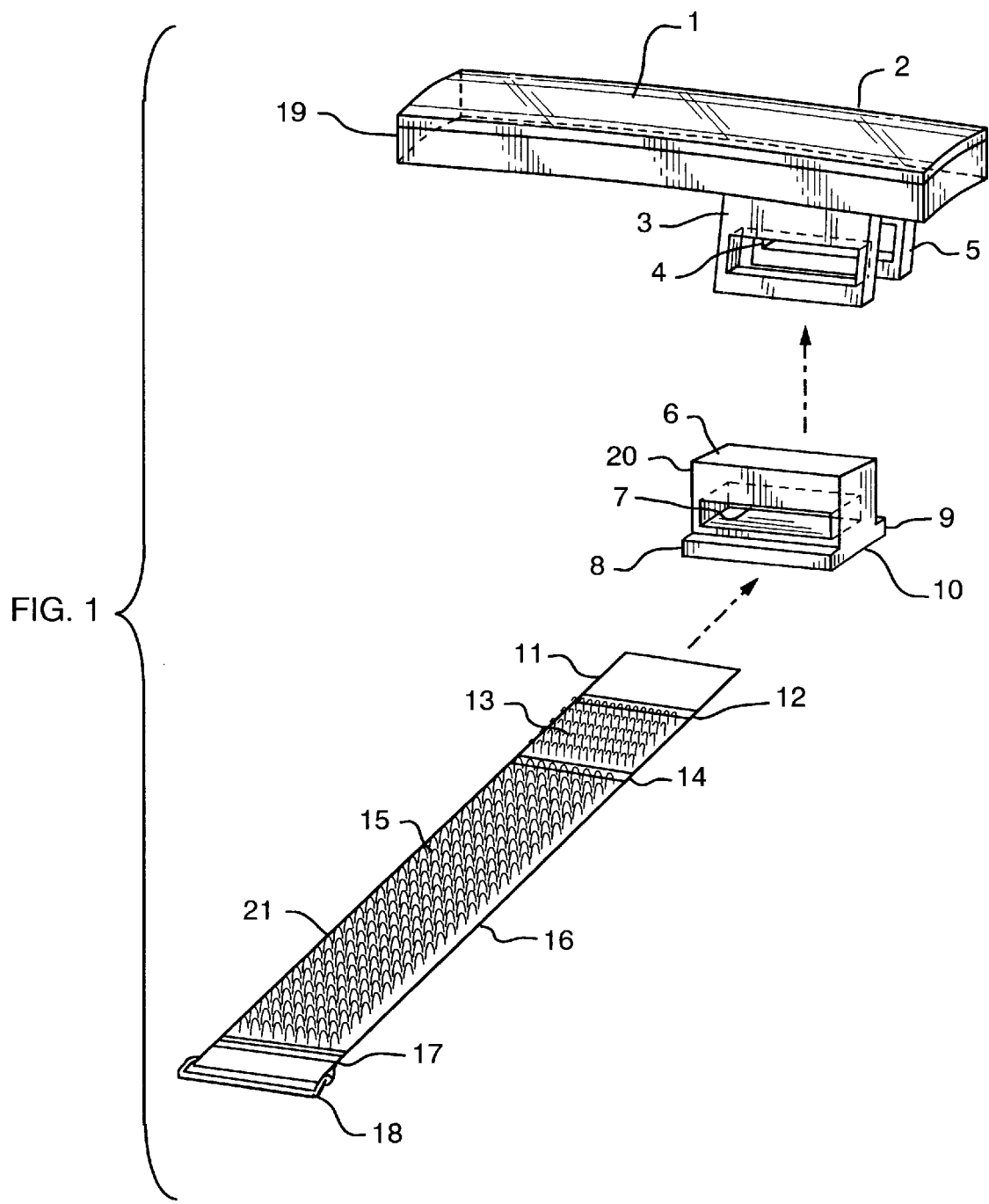
FIG. 1 is an exploded isometric view of the finger mount rear view mirror in accordance with the invention.
Figure 2:
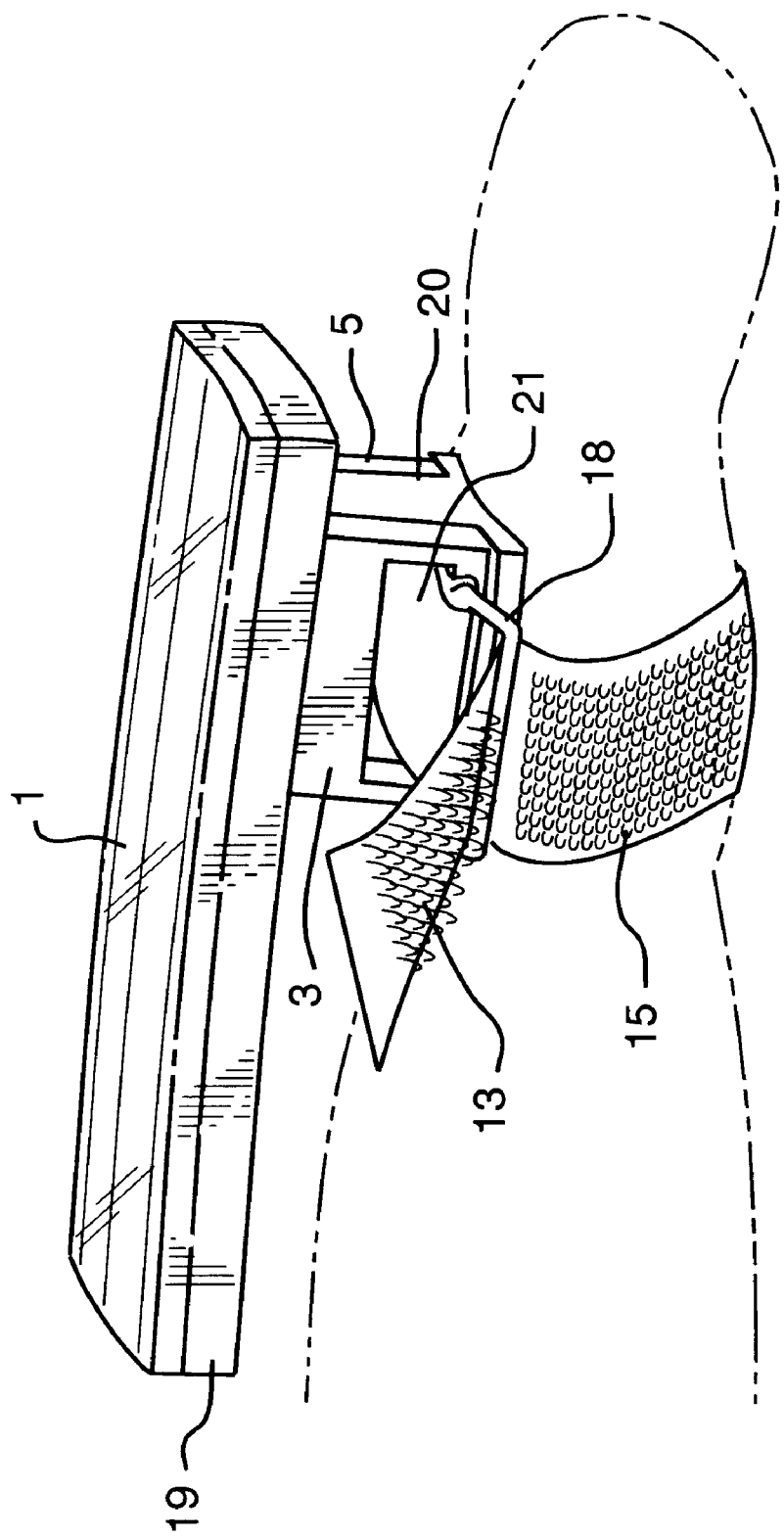
FIG. 2 is an isometric view of invention mounted on a user's finger.
Figure 3A:
FIG. 3A is a detailed side view of the main body.
Figure 3B:
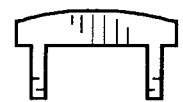
FIG. 3B is a detailed end view of the main body.
Figure 3C:
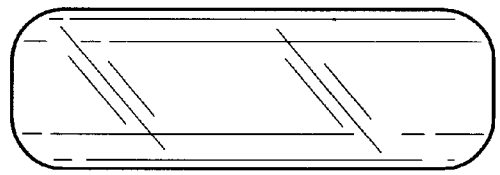
FIG. 3C is a detailed top view of the main body.
Figure 3D:
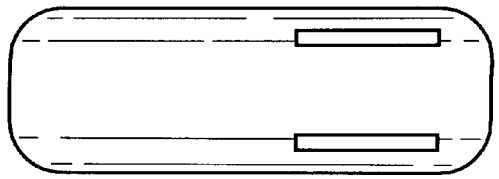
FIG. 3D is a detailed bottom view of the main body.
Figure 3E:
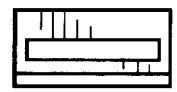
FIG. 3E is a detailed side view of the insert.
Figure 3F:
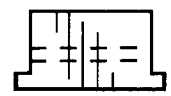
FIG. 3F is a detailed end view of the insert.
Figure 3G:
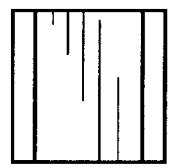
FIG. 3G is a detailed top view of the insert.
Figure 3H:
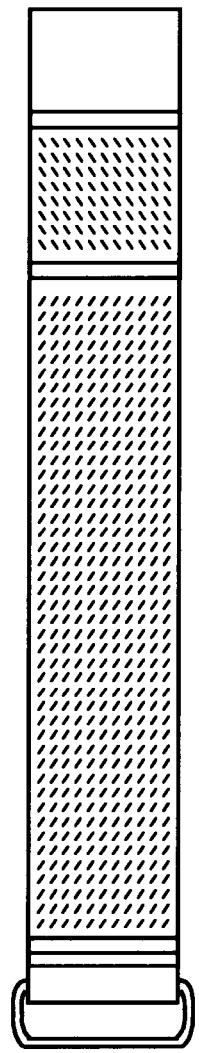
FIG. 3H is a detailed front view the strap.

The preferred embodiment of the invention 10 is shown in FIGS. 1 through 3H. Main body 12 is preferable a section of a sphere with a 16 inch radius. While a variety of shapes and sizes can be utilized as main body 12, main body 12 must correspond to the finger that invention 10 is mounted upon. The following dimensions and shapes assumed that invention 10 will be mounted on a typical index or middle finger. Selection of a different mounting finger or a child user would require that dimensions and shapes be adjusted accordingly.

Body 12 is preferably a rectangle measuring approximately 2¼ inches by ¾ inches and preferably molded in polycarbonate or similar plastic material. Body 12 is preferably about ⅛ inches thick.

Reflective surface 14 utilizes the reflective properties of a material such as aluminum. The reflective surface 14 may be coated with aluminum in such a way as to make it reflective. Surface 14 is then covered with a clear coat of quartz in order to protect from scratching. While reflective surface 14 is shown as being integral with main body 12, it could also be manufactured separately. Reflective surface 14 may make use of the reflective properties of materials such as aluminum, which may be protected by glass and attached to the surface as an additional component.

From the bottom of body 12, two stems 16 and 18 protrude. Each stem is about ½ inch wide, and extends downward ¼ of an inch.

Each stem 16 and 18 has a slot 20 which passes completely through each stem. The stems 16 and 18 are spaced about ½ inch apart from one another.

Insert 22 is made to fit snugly in the space between the stems 16 and 18. Insert 22 is preferably molded using a soft material, such as vinyl. Insert 22 should have a pliable surface 24, and a pliable bottom 26. These properties allow the user to press their finger to the bottom of the insert 22, and have the insert 22 respond by flexing to fit specific curves of the user's finger. Insert 22 provides cushion and protection from stems 16 and 18 by introducing insert feet 28 and 30, which separate the user's finger from the stems 16 and 18. Slot 32 runs completely through the insert 22, and follows the same curve of the concave bottom 26.

When the insert 22 is installed between the stems 16 and 18 which are attached to the body 12, the slot 32 in insert 22 lines up with the slot 20 through the stems 16 and 18.

An adjustable strap 34 is used to join the insert 22 and the body 12, and to attach the invention 10 to the user's finger. This strap 34 is preferably made from loop fastener 36, which will allow the user to adjust the invention to fit their specific finger at a preferred tightness. The strap 34 measures about 3¾ inches long and about ½ inches wide so that most finger sizes can be accommodated.

A length of hook fastener 38 is sonic welded via welds 40 and 42 to the loop fastener 36. The hook fastener 38 measures about ½ inch wide and about ½ to ¾ inches long. Note that hook fastener 38 and loop fastener 36 could be switched and invention 10 would still function. The present arrangement is preferred since the hook fastener tends to grab other materials so that having that the hook fastener be the shortest section is preferable.

The hook fastener 38 is placed about ¾ inches from the end opposite the curved buckle 44. The area of loop fastener 36 which continues from the hook fastener 38 to the end forms a tab 46, which can be used to easily adjust the strap 34 for maximum hold and comfort. While flat, the adjustable strap 34 is fed through the slot 20 in stem 16, the slot 32 in insert 22, and out through slot 20 in stem 18. The adjustable strap 34 is passed through in such a way so the loop fastener 36 and the hook fastener 38 are facing up toward the body 12. The adjustable strap 34 is pulled until the curved buckle 44 is flush against stem 16 or stem 18. Buckle 44 is preferably a rectangular-shape having an opening 50 so that tab 46 is able to be inserted through so that hook fastener 38 can be attached to loop fastener 36, thus, holding invention 10 securely in place on the user's finger.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A viewing apparatus to enable a user to see a portion of the user's surroundings which are behind said user and which said user wishes to view, said apparatus comprising:

a main body having a top, bottom and a shape that corresponds to one of the user's fingers;

a reflective surface attached to the top of said main body;

mounting means for attaching said main body to the user's finger which said main body corresponds, such that said user can position the finger with the viewing apparatus so that when said user looks into said reflective surface, said user is able to see the portion behind said user that said user wishes to view;

a pair of spaced apart stems rigidly attached to the bottom of the said main body, said stems each having a slot;

an insert having a compliant bottom, dimensioned to fit between said pair of spaced apart stems, said insert also having a slot corresponding to the slots in said stems, such that said mounting means attaches said main body to the user's finger by passing through the slots in said stems and the slot in said insert when said insert is positioned between said stems.

2. A viewing apparatus to enable a user to see a portion of the users surroundings which are behind said user and which said user wishes to view, said apparatus comprising:

a main body having a top, bottom, and a shape that corresponds to one of the user's fingers;

a reflective surface attached to the top of said main body;

mounting means for attaching said main body to the user's finger which said main body corresponds, such that said user can position the finger with the viewing apparatus so that when said user looks into said reflective surface, said user is able to see the portion behind said user that said user wishes to view;

a pair of spaced apart stems rigidly attached to the bottom of said main body, said stems each having a slot;

an insert having a compliant bottom, dimensioned to fit between said pair of spaced apart stems, said insert also having a slot corresponding to the slots in said stems, such that said mounting means attaches said main body to the user's finger by passing through the slots in said stems and the slot in said insert when said insert is positioned between said stems;

wherein said compliant bottom of said insert is made from vinyl.

3. A viewing apparatus to enable a user to see a portion of the user's surroundings which are behind said user and which said user wishes to view, said apparatus comprising:

a main body having a top, bottom, and a shape that corresponds to one of the user's fingers;

a reflective surface attached to the top of said main body;

mounting means for attaching said main body to the user's finger which said main body corresponds, such that said user can position the finger with the viewing apparatus so that when said user looks into said reflective surface said user is able to see the portion behind said user that said user wishes to view;

a strap having two ends, a section of loop fastener, and a section of hook fastener attached thereto, said strap also having a length that corresponds to the user's finger;

a pair of spaced apart stems rigidly attached to the bottom of the said main body, said stems each having a slot;

an insert having a compliant bottom, dimensioned to fit between said pair of spaced apart stems, said insert also having a slot corresponding to the slots in said stems, such that said mounting means attaches said main body to the users finger by passing through the slots in said stems and the slot in said insert when said insert is positioned between said stems;

a buckle positioned at one end of said strap so that once said strap is passed through the slots in said stems and the slot in said insert when said insert is positioned between said stems, the other end of said strap may be passed through said buckle so that said section of loop fastener may be releasably attached to said section of hook fastener, thus, securely fastening said apparatus on said user's finger.

* * * * *